Nov. 3, 1931.        J. E. TSAVARIS        1,829,842
MEASURING DISPENSER
Filed April 6, 1931    2 Sheets-Sheet 1
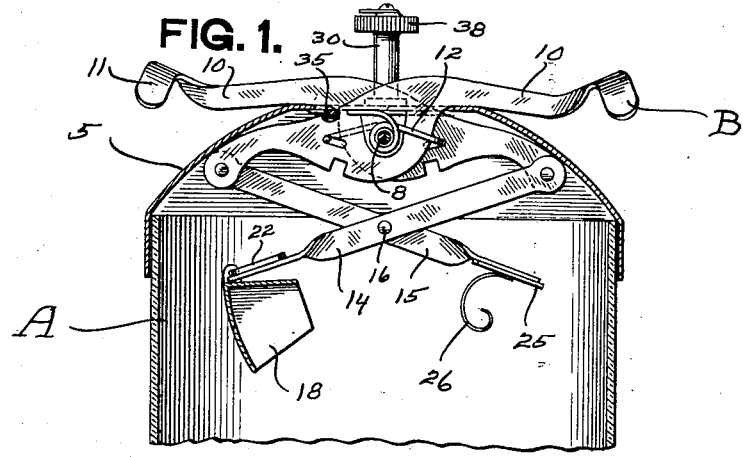
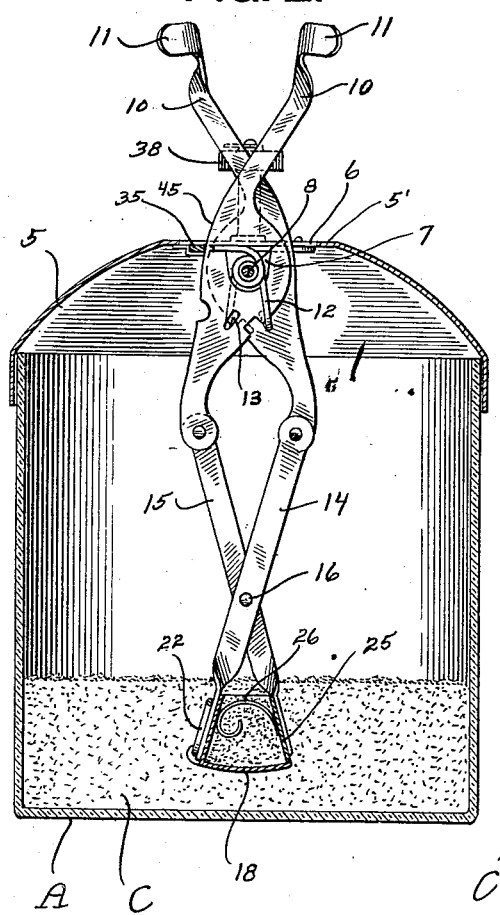
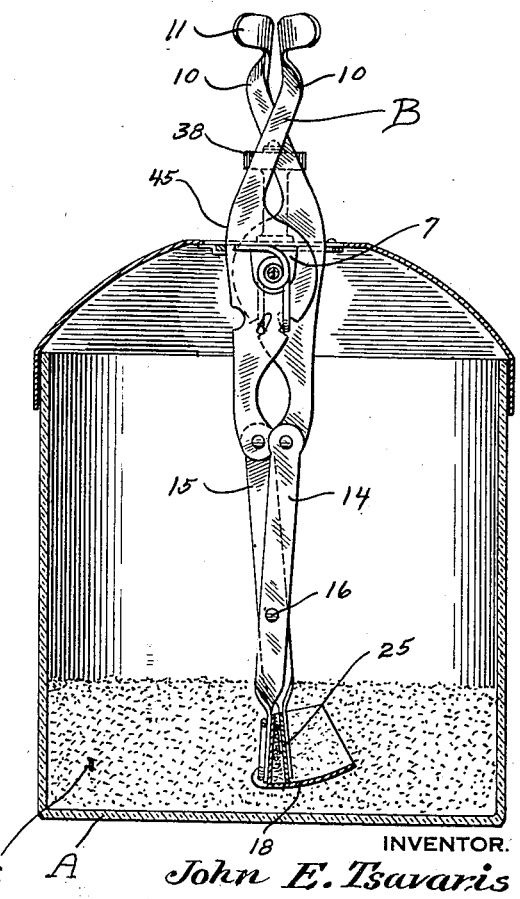
INVENTOR.
John E. Tsavaris
BY
Lancaster, Allwine and Rommel
ATTORNEYS.

Nov. 3, 1931.  J. E. TSAVARIS  1,829,842
MEASURING DISPENSER
Filed April 6, 1931  2 Sheets-Sheet 2
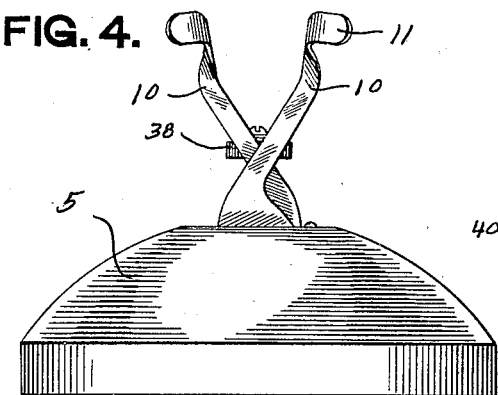
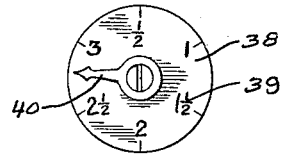
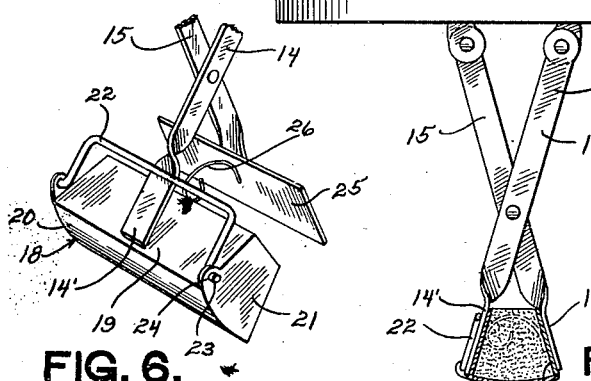
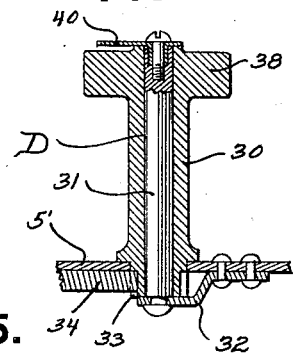
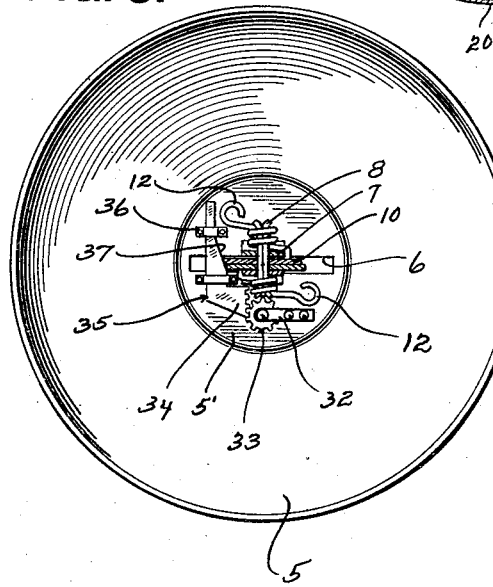
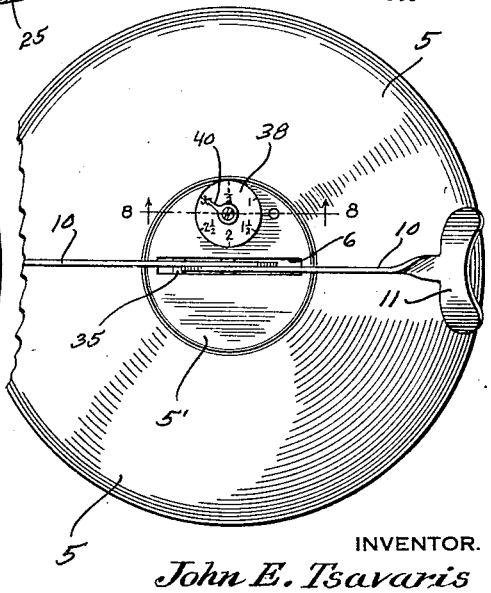
INVENTOR.
John E. Tsavaris
BY Lancaster, Allwine and Rommel
ATTORNEYS.

Patented Nov. 3, 1931

1,829,842

UNITED STATES PATENT OFFICE

JOHN E. TSAVARIS, OF TARPON SPRINGS, FLORIDA

MEASURING DISPENSER

Application filed April 6, 1931. Serial No. 528,176.

The present invention relates to dispensing devices and the primary object of the invention is to provide an improved form of sanitary sugar bowl cover embodying means for removal of desired quantities of sugar from the bowl.

A further object of the invention is to provide a lid or cover for sugar bowls embodying a measuring device embodying regulating means whereby the user may remove a desired amount of sugar from the bowl.

A further object of the invention resides in the provision in a lid or cover for sugar bowls and like containers of granulated material, a toggle operated scoop which is normally out of contact with the granulated material and capable of being lowered into the receptacle for removal of a measured quantity thereof.

A further object resides in the novel manner of pivotally mounting the scoop to permit automatic tilting and dumping of its contents upon release of the operating handles.

A further object resides in the novel arrangement whereby the pivoted scoop is swung into a material holding position after entering the material or while being lowered thereinto.

Other objects and advantages of the invention will be apparent during the course of the following detailed description, taken in connection with the accompanying drawings forming a part of this specification and in which drawings:

Figure 1 is a sectional view thru the combined cover and dispensing means shown applied to a container and showing the dispensing means in its normal position.

Figure 2 is a sectional view thru the lid and container and showing the scoop lowered and a measuring means set for obtaining a maximum amount of material in the scoop.

Figure 3 is a sectional view similar to Figure 2 but showing the regulating means set for obtaining the minimum amount of the material in the scoop.

Figure 4 is a side elevation of the combined lid and dispensing means showing the scoop in section.

Figure 5 is a top plan view of the device.

Figure 6 is a bottom plan view of the lid showing parts of the dispensing means in section.

Figure 7 is a perspective view of the lower end of the levers carrying the scoop and regulating plate.

Figure 8 is an enlarged fragmentary section on the line 8—8 of Figure 5.

Figure 9 is a top plan view of the knob and pointer with which the knob is associated for determining the quantity of material gathered in the scoop.

Referring to the drawings in detail, and wherein similar reference characters designate corresponding parts thruout the several views, the letter A designates a container preferably in the form of a sugar bowl and B a combined measuring and dispensing device for removing measured quantities of the material such as sugar from the bowl A.

The bowl A may be of any desired shape and the dispensing device B also serves as a closure for the open upper side of the bowl.

The measuring dispenser B comprises a support or carrier portion 5 which may be of inverted cup-shape and serves as a lid or cover for the container A. The cover forming portion 5 may be formed of a suitable sheet metal and is formed at its crown with a flat disc-like portion 5' provided with a diametrically disposed slot 6.

Secured to the under side of the disc portion 5' is a pair of L-shaped brackets 7 having their depending arm portions arranged in parallel relation at opposite sides of the slot 6. Pivotally mounted intermediate their ends between the brackets 7 as upon a pivot pin 8 extended thru the depending arms of the brackets, is a pair of operating levers 10 having their upper portions extending thru the slot 6. The upper ends of the operating levers 10 are formed with suitable finger grips 11 which may receive the thumb and forefinger of the operator for closing the levers in the manner of operating shears. The pivot 8 projects for a substantial distance beyond each of the brackets 7 and coiled about each end portion of the pin is a coil spring 12, each having one end bearing against the under side of the disc portion 5' and its opposite end engaging in a slot 13 provided in the operating levers below the pivot pin. These springs 12 serve as return springs for the operating levers and act to normally spread the levers into a position as shown in Figure 1. When the operating levers 10 are in their normal spread position the lower ends of the levers are retracted into the cup cover forming portion 5 and spreading movement of the operating levers may be limited by engagement of the arms with the cover.

Pivotally connected at their upper ends to the lower ends of the operating levers 10 is a pair of cross connected levers 14 and 15, which are pivotally connected in crossed relation as at 16 whereby a lazy tong structure is provided. These cross connected arms or levers 14 and 15 may be formed from flat strips of sheet metal and below the pivots 16 may be given a one-quarter twist to form attaching portions at the lower ends of the levers.

Carried by the lower end of the lever 14 is a measuring scoop 18 including a flat rear wall 19 from the lower edge of which is a forwardly extending arcuate bottom wall 20, and a pair of end walls 21 having upwardly converging side edges converging to a point forming the axis for the arc of the bottom wall 20. Secured as by welding, soldering or the like to the rear side of the attaching portion 14' of the lever 14 is a yoke 22 provided at the lower end of each of its arms with an outturned pivot pin portion 23 for pivotal mounting in apertured ears 24 projecting rearwardly from the lower portion of the end walls 21 of the scoop 18. The lower end of the attaching portion 14' projects slightly below the axis of the pivot pins 23 and acts to limit tilting movement of the scoop when in a raised or discharging position as shown in Figure 1. When the scoop 18 is lowered into the sugar or other granular material C, the rear wall 19 of the scoop engages against the lever portion 14' and limits rearward swinging of the scoop.

Fixedly secured to the lower attaching portion 15' of the lever 15 is a flat, rectangular-shaped regulating plate 25 for regulating the quantity of material picked up by the scoop 18. This plate 25 is of a size to have movement into the open side of the scoop and forms a retaining wall for the open side of the scoop when the dispenser is withdrawn from the sugar bowl.

Secured to the inner side of the regulating plate 25 is a substantially C-shaped wire spring 26 which is adapted to engage the rear wall 19 of the scoop and straighten the scoop against the lever attaching portion 14' prior to entry of the adjusting plate into the open side of the scoop. This spring member 26 is of such nature as to permit movement of the plate 25 to various degrees into the open side of the scoop.

A regulating means D is provided for adjustably regulating closing movement of the operating levers 10 and movement of the regulating or retaining plate 25 into the open side of the scoop 18. This regulating means D embodies a rotatable setting knob 30 rotatable about a hub pin 31 extended thru the disc portion 5' of the cover 5 and anchored at its lower end against rotation by a suitable bracket 32 secured to the disc portion. The tubular body portion of the setting knob has its lower portion extended thru the disc portion 5' and below the disc portion is formed with a pinion 33 which meshes with the rack portion 34 formed upon one end of an adjusting plate 35. This adjusting plate 35 extends transversely across the slot 6 at one side of the operating levers 10 and is guided for longitudinal movement in suitable guide brackets 36. The inner edge of the adjusting plate, confronting the operating levers 10 is provided with an inclined or cam edge portion 37 which extends transversely at the under side of the slot 6 at a location spaced above the pivot pin 8. The upper end of the setting knob 30 is provided with a disc-like head 38 provided on its upper surface with suitable graduations 39 representing quantities of the material C gathered in the scoop 18. These graduations may represent quantities of the sugar in spoonfuls or half spoonfuls. Fixed upon the upper end of the non-rotatable hub pin 31 is a suitable pointer 40 for co-acting with the graduations 39 and this pointer may also act as a retaining means for the setting knob to prevent upward movement of the knob off the hub pin. As will be observed in Figure 1, when the lazy tong scoop operating structure is in its normal retracted position, the operating levers 10 are disposed so as to not interfere with proper grasping of the head 38 for rotating the setting knob.

In operation, and with the parts in their normal position as shown in Figure 1, the operator rotates the setting knob 30 to the desired one of the markings 39 for setting the measuring dispenser for the quantity of sugar desired. This rotation of the setting knob 30, thru its pinion 33 moves the adjusting plate 35 longitudinally. The operator then grasps the finger grips 11 and swings the upper portions of the operating levers 10 toward one another until the stop forming edge 45 of one of the levers 10 abuts against the cam edge 37 of the adjusting plate and limits closing movement of the levers. This closing movement of the operating levers lowers the scoop 18 into the material C and the regulating or retaining plate 25 into a closing position over the open side of the scoop. Adjustment of the regulating means D determines the extent of movement of the plate 25 into the scoop 18. The dispenser may then be raised from the container A and by allowing spreading of the operating levers 10 the levers 14 and 15 will be drawn against the lid 5 and allow the material to drop from the scoop 18.

By observing Figures 2 and 3 it will be seen the manner in which the lever edge 45 engages the adjusting plate 35 for regulating the quantity of material picked up by the scoop 18. With the device set for dispensing a small quantity of the material as shown in Figure 3, it may be necessary to slightly tilt the dispenser prior to removal from the container in order to remove that portion of the sugar in the scoop at the outer side of the regulating plate.

From the foregoing it will be seen that a novel form of measuring dispenser of this character has been provided whereby predetermined quantities of material may be dispensed in a clean and sanitary manner.

Changes in detail may be made to the form of invention herein shown and described, without departing from the spirit of the invention or the scope of the following claims.

I claim:

1. In a measuring dispenser the combination of a supporting frame member, a pair of cross connected operating levers pivotally mounted beneath the frame member and having their upper portions projecting above the frame member, a pair of cross connected arms pivotally connected to the lower ends of the operating levers, a scoop carried by the lower end of one of the arms, and regulating means for determining the quantity of material gathered in the scoop.

2. In a measuring dispenser the combination of a supporting frame member, a pair of cross connected intermediately pivoted operating levers, a pair of cross connected intermediately pivoted arms pivotally connected with the lower ends of the operating levers, an open sided scoop carried by the lower end of one of the arms, and a plate carried by the lower end of the companion arm for closing the open side of the scoop upon closing movement of the operating levers.

3. In a measuring dispenser the combination of a supporting frame member, a pair of cross connected intermediately pivoted operating levers, a pair of cross connected intermediately pivoted arms pivotally connected with the lower ends of the operating levers, an open sided scoop carried by the lower end of one of the arms, a retaining member carried by the lower end of the companion arm for movement into the scoop at the open side thereof, and regulating means for regulating movement of the retaining member into the scoop upon closing movement of the operating levers.

4. In a measuring dispenser the combination of a supporting frame member, a pair of operating levers, means pivotally mounting the levers in cross relation on the supporting frame member, a pair of cross and intermediately pivoted arms pivotally connected to the lower ends of the operating levers, an open sided scoop carried by the lower end of one of the arms, a retaining plate carried by the lower end of the companion arm for closing the open side of the scoop, and adjustable movement limiting means for the operating levers for regulating the degree of movement of the retaining plate into the scoop.

5. In a measuring dispenser the combination of a lazy tong structure embodying a pair of operating levers and a pair of lever arms, a scoop having an open side, carried by the lower end of one of the arms, and a retaining plate carried by the lower end of the companion arm for closing the open side of the scoop when the lazy tong structure is extended by the operating levers.

6. In a measuring dispenser the combination of a supporting frame member, a pair of cross connected operating levers pivotally supported by the frame member, a pair of cross connected lever arms connected with the lower ends of the operating levers, an open sided scoop pivotally carried by the lower end of one of the lever arms and having limited swinging movement, a retaining plate carried by the lower end of the companion lever arm for closing the open side of the scoop, a spring member carried by the retaining plate for righting the scoop prior to movement of the retaining plate into retaining relation at the open side of the scoop, and spring means normally urging the operating levers in a folded position and movement of the scoop into a discharging position.

7. In a measuring dispenser the combination of a supporting frame member including a disc portion, a pair of operating levers pivotally supported in crossed relation upon the disc portion and having their upper ends projecting thru a slot in the disc portion, cross connected lever arms pivotally connected to the lower ends of the operating levers, a scoop carried by the lower end of one of the arms, a retaining plate carried by the lower end of the companion arm for retaining material in the scoop, and regulating means for determining closing movement of the lever arms embodying an adjustable plate having a cam portion movable transversely of the slot in said disc portion to be engaged by one of the operating levers for limiting closing movement of the operating levers.

8. In a measuring dispenser the combination of a supporting frame member including a mounting disc having a slot formed therethru, a pair of crossed operating levers extending thru the slot, means pivotally connecting the levers in cross relation below the mounting disc, a pair of lever arms pivoted upon the lower ends of the operating levers and pivotally connected in crossed relation, an open sides scoop carried by the lower end of one of the arms, a regulating plate carried by the lower end of the companion arm for movement into the scoop, an adjusting plate guided for sliding movement beneath the mounting disc and having a cam edge extending across the slot to be engaged by one of the operating levers for limiting closing movement of the levers, and adjusting means for the regulating plate.

9. In a measuring dispenser the combination of a supporting frame member including a mounting disc having a slot formed therethru, a pair of crossed operating levers extending thru the slot, means pivotally connecting the levers in cross relation below the mounting disc, a pair of lever arms pivoted upon the lower ends of the operating levers and pivotally connected in crossed relation, an open sided scoop carried by the lower end of one of the arms, a regulating plate carried by the lower end of the companion arm for movement into the scoop, an adjusting plate guided for sliding movement beneath the mounting disc and having a cam edge extending across the slot to be engaged by one of the operating levers for limiting closing movement of the levers, and a setting knob rotatably supported upon the mounting disc and operatively connected for movement of the adjusting plate.

10. In a measuring dispenser the combination of a mounting disc having a slot formed therethru, a lazy tong structure including a pair of cross connected operating levers extending thru said slot and a pair of cross connected lever arms, means pivotally mounting the operating levers in crossed relation, an open sided scoop carried by the lower end of one of the lever arms, a retaining plate carried by the lower end of the companion arm for closing the open side of the scoop, and regulating means for adjustably limiting closing movement of the lazy tong structure including an adjusting plate slidably mounted beneath the mounting disc including a cam edge traversing said slot and a rack portion, an operating knob rotatably supported above the mounting disc and having a pinion engageable with said rack portion of the adjusting plate, and indicator means for the setting knob.

11. In a measuring dispenser including a lazy tong structure embodying a pair of cross connected operating levers, a mounting disc for the levers and having a slot thru which the levers project, and regulating means for determining closing movement of the lazy tong structure including an adjusting plate embodying a cam portion movable transversely beneath said slot and a rack portion, said cam portion to be engaged by one of said operating levers, a hub pin fixedly mounted upon the disc, a setting knob rotatable about the hub pin and having its lower end projecting thru the disc and formed with a pinion engageable with said rack, said setting knob having a head portion provided with graduations on its upper side, and a fixed pointer carried by the upper end of the hub pin for co-acting with the graduations.

12. In a measuring dispenser the combination with a container, of a supporting member providing a lid for the container, a pair of cross and intermediately pivoted operating levers projecting thru the lid, a pair of cross connected lever arms connected with the lower ends of the operating levers, an open sided scoop carried by the lower end of one of the lever arms, a retaining plate carried by the lower end of the companion lever arm for movement into the scoop, spring means normally urging the operating levers to a closed position, and regulating means for regulating the degree of movement of the retaining plate into the scoop embodying an operating knob projecting above the operating levers when in their folded position.

JOHN EMMANUEL TSAVARIS.